United States Patent [19]

Powell et al.

[11] 4,279,159

[45] Jul. 21, 1981

[54] VIBROMETER

[76] Inventors: J. Laurence Powell, 19 Hiddenfield St., Andover, Mass. 01810; Richard A. Powell, 6102 N. Glenwood, Chicago, Ill. 60660

[21] Appl. No.: 57,572

[22] Filed: Jul. 16, 1979

[51] Int. Cl.³ .............................................. G01D 21/00
[52] U.S. Cl. ......................................... 73/651; 73/146
[58] Field of Search ................. 73/651, 460, 487, 146, 73/579

[56] References Cited

U.S. PATENT DOCUMENTS

| | | |
|---|---|---|
| 1,416,550 | 5/1922 | Frank . |
| 1,687,507 | 10/1928 | Perkins . |
| 1,948,104 | 2/1934 | Firestone et al. . |
| 2,263,334 | 11/1941 | Hanley . |
| 2,301,291 | 11/1942 | Kolesnik . |
| 2,303,234 | 11/1942 | Schwarzkopf et al. . |
| 2,399,297 | 4/1946 | Rudolph . |
| 2,424,864 | 7/1947 | Treseder ................................ 73/651 |
| 2,428,671 | 10/1947 | Kent et al. . |
| 2,429,094 | 10/1947 | Kent et al. ............................ 177/351 |
| 2,447,863 | 8/1948 | Kent et al. ............................ 177/351 |
| 2,496,295 | 2/1950 | Langer . |
| 2,511,694 | 6/1950 | Burkhardt ................................ 264/1 |
| 2,514,153 | 7/1950 | Dickerson ........................... 73/651 X |
| 2,543,573 | 2/1951 | Gifford ................................. 73/651 |
| 2,654,595 | 10/1953 | Harstick .................................. 264/1 |
| 2,730,895 | 1/1956 | Gadd . |
| 2,900,817 | 8/1959 | Grindle et al. . |
| 2,906,117 | 9/1959 | Kennard, Jr. . |
| 2,946,218 | 7/1960 | Karpchuk . |
| 2,974,521 | 3/1961 | Phelps . |
| 3,174,331 | 3/1965 | Doherty et al. . |
| 3,224,279 | 12/1965 | Galli et al. ........................... 73/651 X |
| 3,310,978 | 3/1967 | Davis . |
| 3,602,037 | 8/1971 | Neu . |
| 4,041,775 | 8/1977 | McNamee . |

FOREIGN PATENT DOCUMENTS 973510  2/1951  France ........................ 73/651

Primary Examiner—Jerry W. Myracle

[57] ABSTRACT

A vibrometer comprising a reed unit adjustably clamped in position within a case. The reed unit includes three vibratory reed portions projecting from a base. Each of the reeds will vibrate at its natural frequency in response to vibration at a preselected vehicle speed, and adjustment of the reed unit according to tire size maintains the speed at which the reeds will vibrate substantially constant.

25 Claims, 7 Drawing Figures

VIBROMETER

This invention relates to vibrometers.

It is a principal object of the present invention to provide a simple and relatively inexpensive vibrometer, particularly for detecting vibration caused by tire or wheel imbalance or alignment in an automobile or truck during normal operation of the vehicle. Other objects include providing such a device that is easily adjustable for use with vehicles of different wheel size, and that detects vibration at a number of different vehicle speeds.

The invention features a vibrometer comprising a reed unit adjustably clamped in position within a case. The reed unit includes at least two vibratory reed portions projecting from a base. Each of the reeds will vibrate at its natural frequency in response to tire vibrations at a preselected speed between 40 and 70 mph, and adjustment of the reed unit according to tire size maintains the speed at which the reeds will vibrate substantially constant. In preferred embodiments in which the reed unit is cut from a thin sheet of organic plastic material, the leading edges of the pieces clamping the unit are stepped to fix a predetermined difference (e.g. 5 or 10 mph) between the speeds at which the reeds will vibrate, the reeds are mounted in an essentially transparent case and have brightly colored tips for ease in observing their vibratory state, and the reed unit comprises three reeds (each to vibrate at a predetermined speed) and is adjustable between at least three predetermined positions (each corresponding to a particular tire size).

Other objects, features and advantages will appear from the following detailed description of a preferred embodiment of the invention, taken together with the attached drawings in which.

Figure 1:
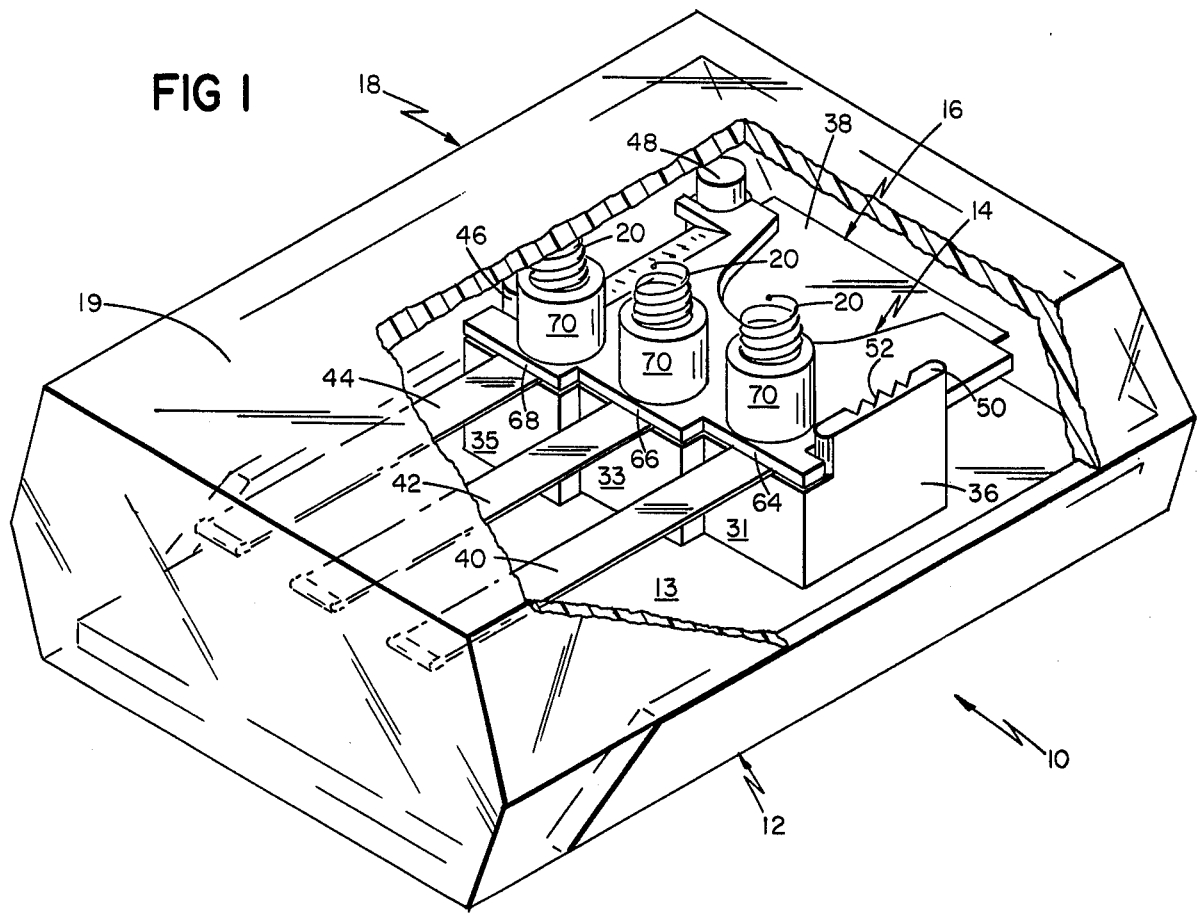
FIG. 1 is a perspective view, partially in section, of a vibrometer comprising the present invention.
Figure 3:
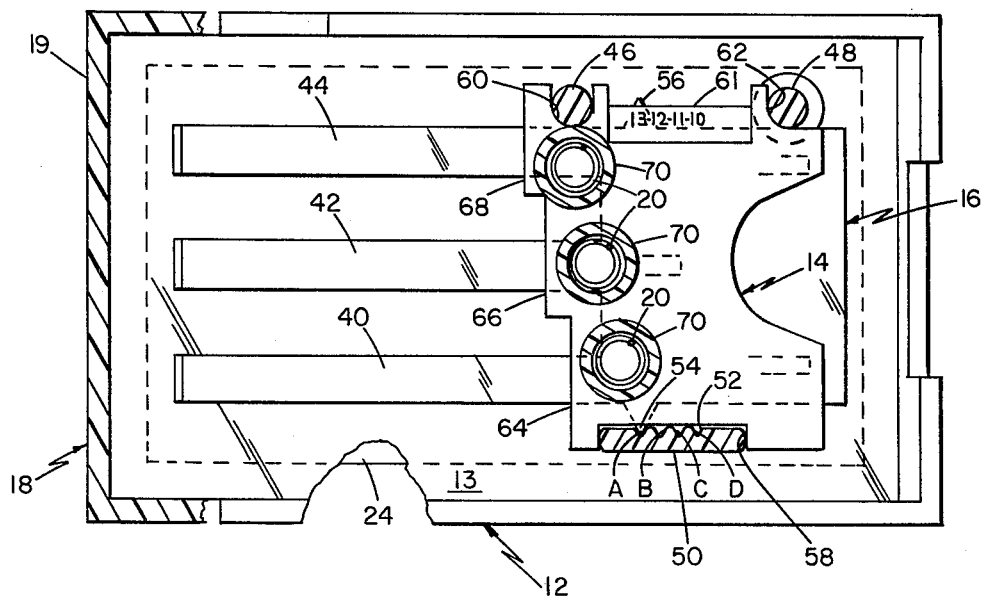
FIG. 3 is a top plan view of the vibrometer of FIG. 1.

Referring now to FIGS. 1–6 of the drawings, there is shown a vibrometer 10 comprising a base 12, clamp 14, reed unit 16, cover 18 and three clamping springs 20. The entire unit is mounted on an automobile by a strip of magnetic material 24, (e.g., barium ferrite in an elastomeric material, of the type made by the 3M Co. and B. F. Goodrich Co.) attached to the underside of the bottom 13 of base 12.

Base 12 (typically of white ABS) includes a flat reed support surface 26 defined by a main transverse support 28 and three projecting fingers 30, 32, 34. The distance between the center lines of fingers 30–34 is equal to that between the centerlines of the three reeds 40, 42, 44 projecting from the base 38 of reed unit 16; and each reed is aligned with and partially overlies a respective finger. The leading edge of support 28 is stepped, each step being perpendicular to the center line of the one of fingers 30–34 with which it is associated. As shown, step 33, aligned with finger 32, lies about 0.071 in. behind step 35, aligned with finger 34; while step 31, aligned with finger 30, is 0.149 in. behind step 35 (and 0.078 in. behind step 33).

For positioning clamp 14 relative to base 12, a pair of cylindrical studs 46, 48 project upwardly from the bottom of base 12 to above reed support surface 26, at one side of finger 34. A fourth finger 36, from the top of which projects an elongated stud 50, is provided at the opposite side of finger 30. A 4-notch saw-toothed recess 52 is cut into the inside of stud 50, with the bottom of the recess coplanar with reed support surface 26.

Reed unit 16 (die cut from a thin film of organic plastic, e.g., a 0.003 in. thick sheet of DuPont Mylar) rests on reed support surface 26, with reed base 38 lying on fingers 30–36 and reeds 40–44 projecting beyond the stepped leading transverse edge of support 28. A locating saw tooth 54 projects from one side of reed base 38 into recess 52 of base 12. An indicating saw tooth 56 projects from the other side of reed base 38 into the space between studs 46, 48. The reed unit 16 is aligned relative to base 12 by engagement between its long sides 55, 57 and, respectively, the inside edge of stud 50 and the insides of studs 46, 48.

Figure 4:
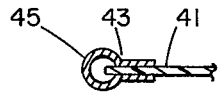
FIG. 4 is a side view of a portion of a reed.
Figure 2:
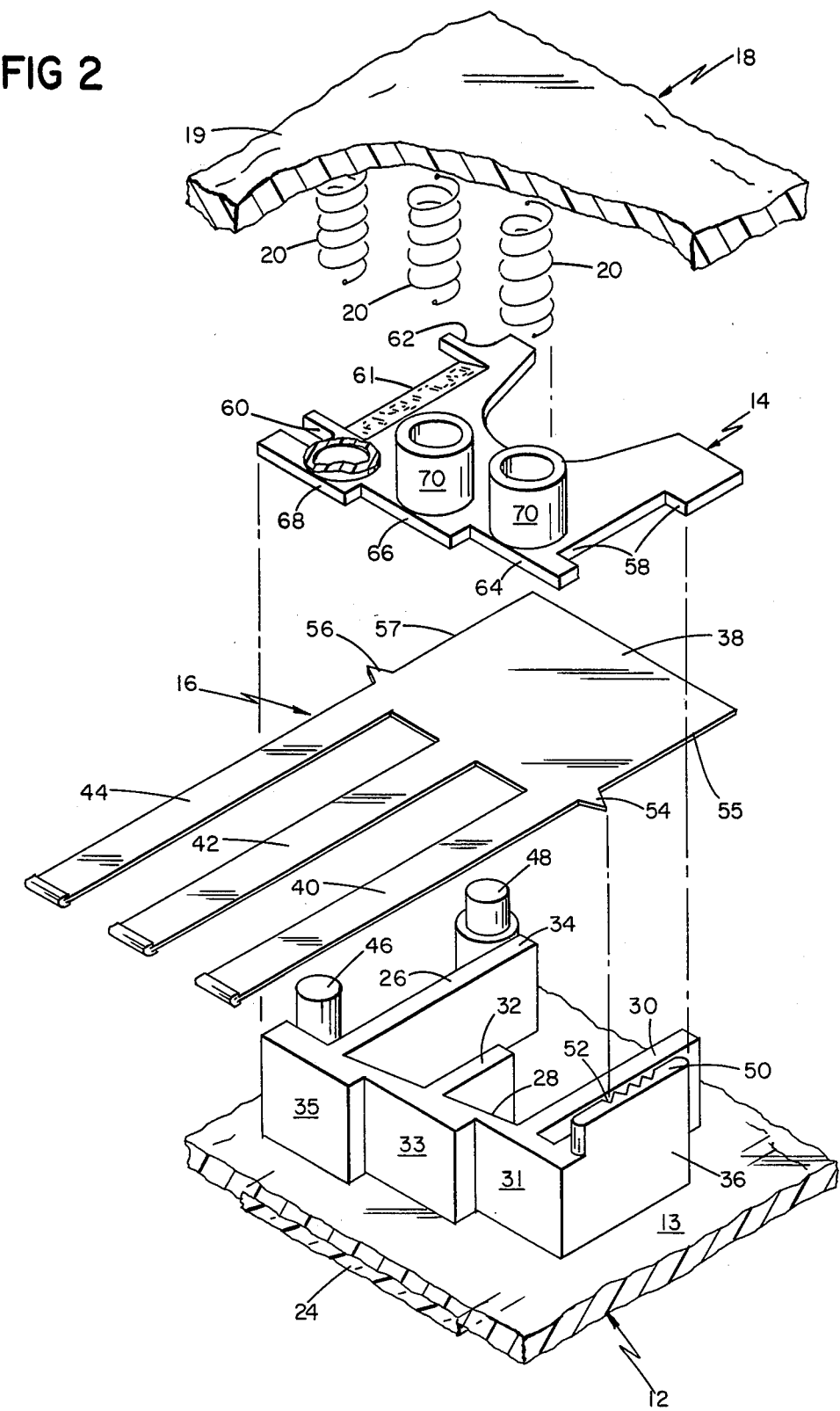
FIG. 2 is an exploded perspective view of portions of the vibrator of FIG. 1.
Figure 5:
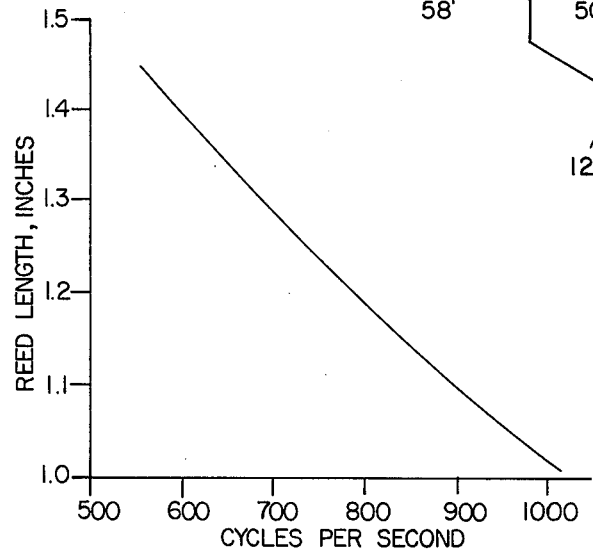
FIGS. 5 and 6 are graphical illustrations of reed length.

As shown in FIG. 4, each of reeds 40, 42, 44 includes both a reed body 41 and a hollow, generally cylindrical tip 43 of aluminum or molded plastic. Each tip 43 is about 0.080" in. diameter, and weighs (including any adhesive used to attach it to the thin plastic body 41 of the reed) about 1.1 mg. Viewed from the front, the end 45 of the tip 43 has a vertical height of at least 1/16" and is a bright color. In the preferred embodiment, the tip of reed 40 is yellow, that of reed 42 is red, and that of reed 44 is orange.

Clamp 14 is also located relative to base 12 by stud 50 and studs 46, 48. As shown, an elongated notch 58 in one side of the clamp receives stud 50. Stud 46 is received in a semicircular recess 60 on the other side of the clamp; and an open notch 62 to the rear of recess 60 engages stud 48. Four raised numbers, e.g., "13", "12", "11", and "10", are provided along the edge of clamp 14 overlying reed indicating tooth 56. As will be apparent, indicating tooth 56 will be aligned with a selected one of the four numbers (i.e., the point of the tooth will project slightly beyond edge 61 adjacent the number), depending upon in which of the four notches (A, B, C, D) of saw tooth recess 52 locking tooth 54 is placed. For reasons discussed hereafter, the distances between the notches are as follows:

A-B (0.071 in)
B-C (0.065 in)
C-D (0.054 in)

The leading edge of clamp 14, like the leading edge of base support 28, is stepped, and the steps 64, 66, 68 are arranged to be aligned with a respective one of base steps 31, 33, 35 when the clamp is fitted onto base 12. An upstanding cylindrical socket 70 is tangent to each of steps 64, 66, 68; and the base of one of springs 20 fits in each socket 70.

Cover 18 (like clamp 14 of a clear material such as NOAN brand styrene methylmethacrylate sold by Richardson Co.) fits over the rest of vibrometer 10, with the bottom of the cover sides snapped into mating recesses along the top of the bottom 13 of base 12. The upper ends of springs 70 bear against the underside of the top 19 of cover 18, and the height of the cover sides is such that the springs are compressed and thus force clamp 14 down against reed unit 16 and base 12.

At speeds less than about 40 or 45 miles per hour (mph), vibration caused by, for example, tire and/or wheel imbalance generally is not objectionable. At speeds in excess of 50 mph, it is both prevalent and objectionable. Accordingly, vibrometer 10 is designed to test for imbalance at speeds in the range of 45 to 55 mph. Although a test for imbalance at a single speed could be made using a single reed, a plurality of reeds is often preferable (vibrometer 10 includes three reeds, one responsive to vibration at each of 45, 50 and 55 mph) to provide a cross-check and to allow for variations in traffic speed.

As die cut, each of reeds 40, 42, and 44 of reed unit 16 has the same overall length (1.44 in. from the edge of reed base 38 to the reed tip), width (0.160 in.) and thickness (0.003 in., except for the tip 43). The effective lengths (from the front 45 of tip 43 to the respective stepped forward edges of clamp 14 and base 12) of the three reeds, however, are different. Because of the stepped configuration of the base and clamp, the effective length of reed 40 is 0.149 in. longer than that of reed 44, and 0.071 in. longer than that of reed 42. Thus, of the three reeds, reed 40 has the lowest, reed 44 the highest, and reed 42 the intermediate natural frequency. The desired frequency and effective length of each are determined, in the manner described hereafter, so that each reed will have a natural frequency that coincides with the frequency of vibration of tire imbalance of a tire of predetermined size at a preselected speed.

The frequency of vibration (f) of a vehicle tire is:

$$f = \frac{5280 \, m}{120\pi \, r} \text{ cycles per minute}$$

where m is the speed of the vehicle in miles per hour and r is the working radius of the tire (actual distance from the tire center to the ground) in feet. For practical working purposes, a sufficiently exact formula is $$f = 14 \frac{m}{r} \text{ cycles per minute}$$

The working radius of most automobile tires lies within the range of about 10 in. to about 13 in. The frequency of vibration of any imbalance of such tires at speeds of 45, 50 and 55 mph, thus, is as set forth in the following table:

TABLE

| Working Tire Radius, Inches | Frequency of Vibration in Cycles Per Minute (cpm) at Various Speeds | | |
|---|---|---|---|
| | 45 mph | 50 mph | 55 mph |
| 10 | 756 | 840 | 924 |
| 11 | 687 | 763 | 840 |
| 12 | 630 | 700 | 780 |
| 13 | 581 | 646 | 711 |

As previously discussed, reeds 40, 42, 44 are essentially identical, differing from each other only in overall effective length. Within the frequency range at which the reeds are intended to detect vibration, the characteristic curve of the reeds (effective length vs. natural resonant frequency) should be essentially linear. Thus, since vibrometer 10 is intended for use with automobiles, it will be seen from the frequency table above that the characteristic curve of a reed having the construction of reeds 40, 42, 44 should be essentially linear between 581 and 924 cycles per minute or, preferably, from about 550 cpm to 1000 cpm.

The characteristic curve of a reed having the construction of the reeds of the preferred embodiment is shown in FIG. 4 and, as there illustrated, is generally (but not absolutely) linear within the 550 cpm to 1000 cpm range. Those skilled in the art will be able to construct reeds having similarly linear characteristic curves, of any of a number of different materials, for whatever range of vibration may be desired.

Figure 6:
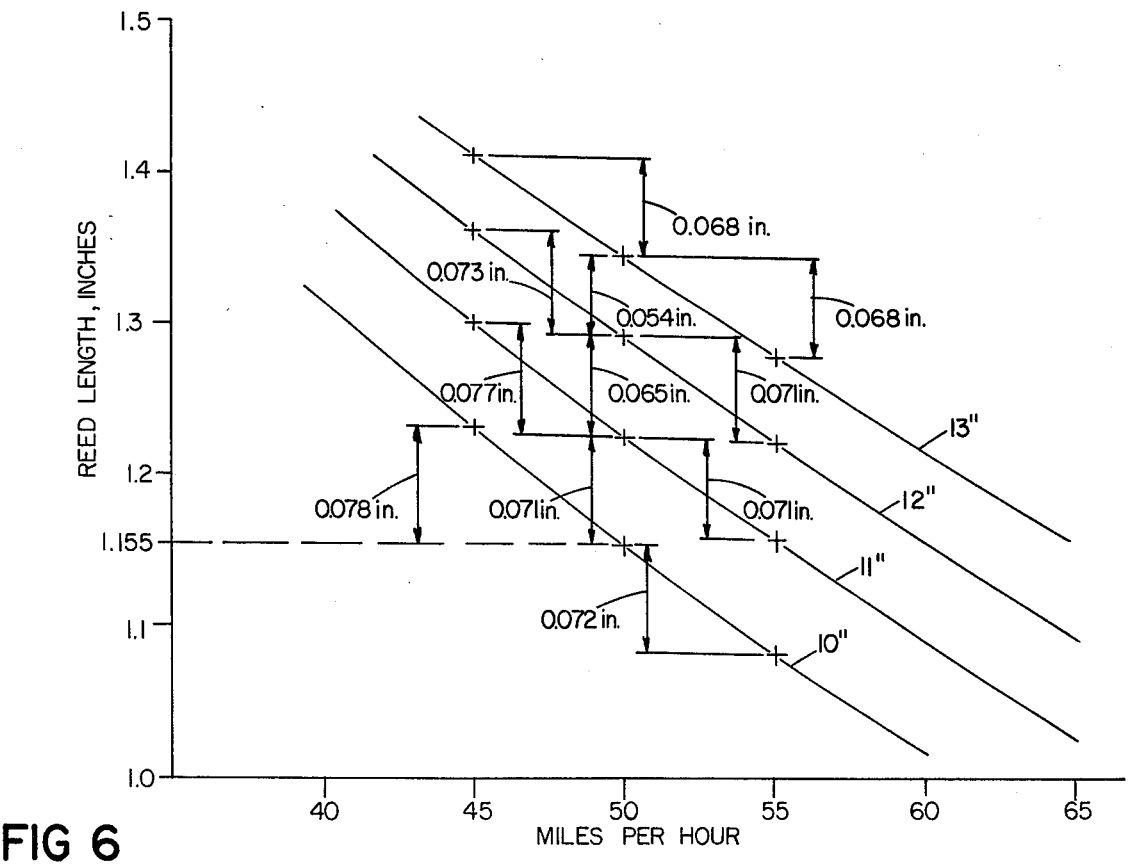

The exact vibration characteristic desired for each of reeds 40, 42, 44 depends on both tire working radius and the vehicle speed at which the particular reed is to detect vibration. The effective length of a reed with this characteristic can be determined, as shown in FIG. 6, by plotting effective reed length vs. vehicle speed (using data from the characteristic curve of FIG. 5) for tires having the sizes used on vehicles with which the vibrometer is to be used through the range of speeds at which vibration is to be detected. As should be apparent, FIG. 6 includes four lines, each of which corresponds to a particular tire working radius (10, 11, 12 or 13 in.) through a 45 to 55 mph range and shows the effective lengths of reeds required for the respective tire size.

The curves shown in FIG. 6 are used in design of the described preferred embodiment. For a tire having an effective working radius of 10 in., the desired effective length of the 45 mph reed is 0.078 in. greater than that of the 50 mph reed, which itself is 0.072 in. more than that of the 55 mph reed. For tires of 11, 12 and 13 in. effective working radius, the differences between 45 and 50 mph reed are, respectively, 0.077, 0.073 and 0.068 in.; while those between the 50 and 55 mph reeds are, respectively, 0.071, 0.071 and 0.068 in. It is desirable that the intervals at which the reeds vibrate not be significantly less than 5 mph; and the forward surfaces of base 12 and clamp 14 of vibrometer 10 defining the effective length of reed 40 (tuned to 45 mph) are stepped 0.078 in. behind the forward surfaces defining the effective length of reed 42 (tuned to 50 mph), which themselves are stepped 0.071 in. behind the forward surfaces defining the effective length of the 55 mph reed, reed 44. Thus, regardless of the tire working radius (13, 12, 11, or 10 in.) for which vibrometer 10 is set, the effective length of reed 40 will always be 0.078 in. more than that of reed 42 and 0.149 in. greater than that of reed 44.

The desired changes in effective reed length corresponding to different tire working radii are provided, as previously indicated, by the notches A-D of saw tooth base recess 52. As will be seen from FIG. 6, reed 42, designed to vibrate at its natural frequency in response to imbalance at a vehicle speed of 50 mph, should have an overall effective length of 1.155 in. when vibrometer 10 is used with tires having a working radius of 10 in.; and should be, respectively, 0.071 in., 0.136 in., and 0.190 in. larger than that when detecting vibration of tires with working radii of, respectively, 11 in., 12 in., and 13 in. These differences are the same as, and determine, the incremental distances, 0.071 in., 0.065 in. and 0.054 in., between the adjacent notches A-D forming the saw tooth adjustment of base recess 52.

Reed unit 16 is constructed so that, when mounted between base 12 and clamp 14, reeds 40, 42 and 44 will have effective lengths of, respectively, 1.233 in., 1.155 in. and 1.084 in., when the reed unit is set for tires having 10 in. working radius. When the position of the reed unit 16 is reset to use vibrometer 10 with tires of a different working radius, the effective lengths of all three reeds are, of course, changed by the same amount. Because the reed characteristic curve is slightly nonlinear, however, these constant changes will result in reed 40 resonating at speeds slightly below the 45 mph design point (i.e., at 44.4 and 44.3 mph respectively) when reed unit 16 is set at, respectively, the 12 in. and 13 in. wheel position; and reed 44 resonating at 50.4 mph rather than 50 mph when reed member is set at the 13 in. wheel position. For practical purposes, these departures from the ideal are insignificant.

Operation

To use vibrometer 10, a person must first determine the effective working radius of his vehicle tires, by measuring the distance (in inches) from the center of a wheel hub to the pavement. He then opens the vibrometer case, by removing case cover 18, and positions reed unit 16 so that indicating tooth 56 is aligned with the appropriate one of the indicating numbers along the edge of clamp 14. Generally, the indicating tooth should be aligned with the number closest to the measured working radius, e.g., if the measured working radius is 10¼ inches, indicating tooth should be aligned with the number "10". If the measured radius is midway between a pair of numbers, the tooth should normally be aligned with the next higher number, since the actual working radius will increase slightly as the air in the tires is heated during vehicle travel.

The vibrometer is next mounted on the vehicle. To determine at which particular wheel or tire a vibration problem is located, the vibrometer should be positioned over each wheel in turn. For front wheels, the vibrometer should be mounted directly on the vehicle fender, directly above or slightly ahead of the center of the wheel hub, with the reeds essentially horizontal and their tips facing towards the driver or other observer. If necessary, the vibrometer may be mounted on a bracket to insure that it is essentially level. For rear wheels, the vibrometer may be mounted on either side of the trunk (or deck in the case of a station wagon), again using a bracket as necessary to insure that it is level.

With the vibrometer in place on the vehicle, the driver then drives in the range of 45 to 55 mph to determine (for each wheel) the speed, if any, at which constant vibration tends to occur. With reed unit 16 set at the proper working tire radius, the three reeds 40, 42, 44 will indicate imbalance (if present) at the following speeds:

| | |
|---|---|
| Right reed (no. 40, yellow-tipped) | 45 mph |
| Middle reed (no. 42, red-tipped) | 50 mph |
| Left reed (no. 44, orange-tipped) | 55 mph |

By driving through the speed for each reed, from about 3 mph below to about 3 mph above the speed, and comparing the vibratory portion of the reed with that of the other two reeds, the driver or other observer can easily tell if vibration is present at the particular speed. If it is, the reed corresponding to the speed will continuously vibrate with a large peak-to-peak amplitude. The other reeds may be subject to short term vibrations due to such things as road bumps, but both the period and amplitude of vibration will be far less.

A location, e.g., left front, right rear, etc., at which a large vibration is detected marks the point at which remedial action (worn shock absorber, out of alignment or bent wheel, or out of balance tire) is most likely to be required.

Other Embodiments

The natural frequency of the reeds used in vibrometers of the present invention depends on the working radius and the speeds at which vibration is to be detected, and thus will vary according to the type of vehicle for which the vibrometer is designed. For example, for a vibrometer designed for use on a truck or other vehicles whose effective tire radius is far more than 13 in., the reeds must have a natural frequency lower than 550 cpm (e.g., reeds having essentially linear characteristic curves between about 400 and 525 cpm should be employed in vibrometers designed for use with a truck whose tires have an 18 in. working radius). Similarly, a wider frequency range is required if, for example, vibration is measured at 40, 50 and 60 mph.

Figure 7:
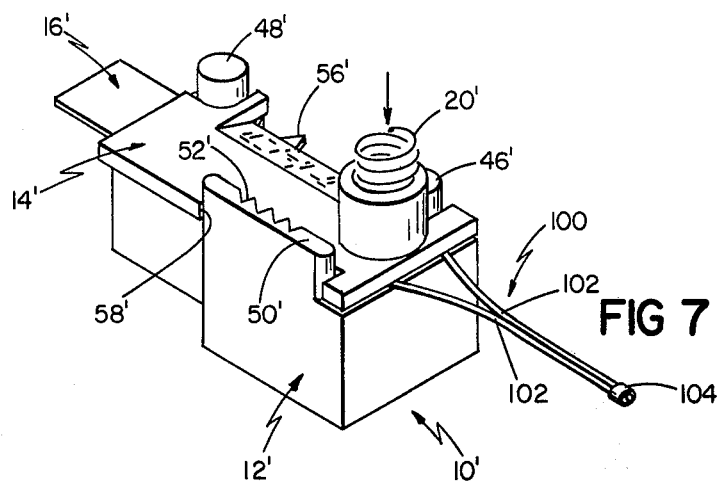
FIG. 7 is a perspective view of portions of a modified vibrometer.

Reeds of different material or construction may be substituted for the die cut Mylar reed unit of the described embodiment, provided only that the characteristic curve of whatever reed is used for each mile per hour position is generally linear over the range of tire sizes for which the vibrometer is intended. For example, each reed may comprise a strip of organic plastic film material other than Mylar (e.g., oriented polystyrene, polyimide (DuPont Kapton), polycarbonate (Monsanto Lexan) or nylon), the sides of each reed may converge toward the tip rather than being parallel; or, as shown in FIG. 7, the reed 100 may comprise a pair of converging wires 102 meeting at the tip 104 rather than plastic film. Reed 100 is generally wish-bone shaped, its wires are, typically, spring brass (0.010 in. in diameter), and the reed tip has a weight of about 0.5 to 1.0 grams. Reed 100 has a very low modulus of elasticity, is very sensitive, and is particularly useful in connection with tires, typically truck tires, greater than two feet in diameter. The vibrometer 10' shown in FIG. 7 is designed for use with trucks and the effective length of its single reed is adjustable, in the same manner as the reed of vibrometer 10, to permit use with various tire sizes.

In multiple reed vibrometers, the reeds themselves may be of different overall length rather than the base and clamp being stepped; the reeds may be vertically spaced one above the other; and each vibrometer may include more or fewer than three reeds.

In any event, the vibrometer may be mounted on its side, so that its reed(s) vibrates horizontally, to pick up sidewise vibration due to a shifted tire belt or tread.

Additionally, user convenience may dictate that the reeds be arranged so that, when the vibrometer is positioned with the reeds horizontal, the reed designed to vibrate at the lowest speed is on the left, rather than on the right as in the FIGS. 1-6 embodiment.

What is claimed is:
1. A vibrometer comprising:
 a support adapted for removable mounting on a vehicle and defining a generally planar reed support surface;
 a reed clamp defining a generally planar reed support surface and mounted on said support with said reed support surface thereof facing said reed support surface of said support;
 a reed unit disposed between and engaging said reed support surfaces, said reed unit comprising a base portion and at least two projecting vibratory reed portions and being movable relative to said support between at least two predetermined positions, one of said reed portions having an effective length that is a predetermined amount greater than that of the other of said reed portions when said reed unit is in either of said predetermined positions, and each of said reed portions being of greater effective length when said reed unit is in one of said positions than when said reed unit is in the other of said positions thereof, cooperating indicia on said reed unit and one of said support and said clamp indicating in which of said predetermined positions said reed unit is located; and, a cover over and generally surrounding said reeds, the generally vertical end of said cover nearest the free ends of said reed portions being essentially transparent whereby an observer may observe vibration of the ends of said portions.

2. The vibrometer of claim 1 wherein the free end of each of said reed portions has a vertical height of not less than about 1/16 in. and a width substantially greater than the height thereof.

3. The vibrometer of claim 1 wherein one of said reed unit and either said clamp or said support defines a plurality of spaced notches and the other of said reed unit and either said clamp or said support defines a projection for engaging a selected one of said notches and locating said reed unit relative to said clamp or support, the effective length of said reed portions when said projection engages one of said notches being greater than when said projection engages another of said notches.

4. The vibrometer of claim 3 wherein the distances between said notches are such that a selected one of said reed portions will vibrate in response to vibration of a tire of one preselected working radius at a particular vehicle speed when said projection engages one of said notches, and said selected one reed will vibrate in response to vibration of a tire of a second preselected working radius at said particular vehicle speed when said projection engages an adjacent one of said notches.

5. The vibrometer of claim 1 wherein the difference in effective length of said reed portions is such that one of said reed portions will vibrate in response to a particular tire vibration at one predetermined speed in the range of 40 to 70 mph and another of said reed portions will vibrate in response to said particular tire vibration at a second predetermined speed in said range.

6. The vibrometer of claim 1 wherein said reed unit comprises three said reed portions.

7. The vibrometer of claim 1 wherein the effective length of one of said reed portions is such that said one reed portion has a natural frequency of vibration of about $km_1/r_1$ cycles per minute in one of said positions thereof and of about $km_1/r_2$ cycles per second in the other of said positions thereof, and another of said reeds has a natural frequency of vibration of about $km_2/r_1$ cycles per minute in one of said positions thereof and of about $km_2/r_2$ cycles per minute in the other of said positions thereof, k being a constant equal to about 14, $m_1$ being a first selected speed (in miles per hour) in the range of 40 to 70 miles per hour, $m_2$ being a second selected speed (in miles per hour), $r_1$ being a first predetermined tire working radius (in feet) and $r_2$ being a second predetermined tire working radius (in feet), whereby when said vibrometer is mounted on a vehicle adjacent a tire having a tire working radius substantially equal to $r_1$ or $r_2$ and said reeds are positioned in the one of said positions corresponding to said working radius of said tire, said one reed will vibrate at its natural frequency of vibration at a vehicle speed of about $m_1$ if vibration is present in said tire and said another reed will vibrate at its natural frequency of vibration at a vehicle speed of about $m_2$ if said vibration is present in said tire.

8. The vibrometer of claim 7 including three of said reeds, the third of said reeds having a natural frequency of vibration of about $km_3/r_1$ cycles per minute in one of said positions thereof and of about $km_3/r_2$ cycles per minute in the other of said positions thereof, $m_3$ being a third selected speed (in miles per hour).

9. The vibrometer of claim 8 wherein each of $m_1$, $m_2$ and $m_3$ are within said range.

10. The vibrometer of claim 9 wherein said range is about 45 mph to 55 mph.

11. The vibrometer of claim 9 wherein $m_1$ is about 45 mph, $m_2$ is about 50 mph and $m_3$ is about 55 mph.

12. The vibrometer of claim 7 wherein the characteristic curve of each of said reeds is generally linear in the range of $km_i/r_1$ to $km_i/r_2$ cycles per minute, $m_i$ being $m_1$ for said one reed and $m_2$ for said another reed.

13. The vibrometer of claim 1 wherein said reed unit comprises a unitary sheet of organic plastic material, said reed portions being substantially parallel to and spaced from each other, and a tip portion mounted on the free end of each of said reed portions.

14. The vibrometer of claim 1 wherein said reed unit includes three reeds projecting therefrom, said vibrometer being arranged such that when said reed unit is clamped between said base and clamp each of said three reeds has a different effective length.

15. The vibrometer of claim 14 wherein said reed unit is adjustable to move said reed unit between said two predetermined positions thereof, each of said reed portions being of a different effective length in each of said predetermined positions.

16. The vibrometer of claim 15 wherein such reed unit is adjustable for moving said reed unit between and locating said reed unit in any one of at least three predetermined positions, each of said predetermined position being associated with a particular effective tire radius and said vibrometer including indicia denominating each of said effective tire radii and indicating in which of said predetermined positions said reed unit is located.

17. The vibrometer of claim 1 including a reed support and a reed clamp, said reeds being mounted between said reed support and said reed clamp, and means for urging said clamp and support towards each other.

18. The vibrometer of claim 17 including a unitary reed unit comprising a base portion from which said one reed and said another reed project substantially parallel to and spaced apart from each other, said reed unit being disposed between said reed clamp and said reed support.

19. A vibrometer comprising:
a support adapted for removable mounting on a vehicle and defining a generally planar reed support surface;
a reed clamp defining a generally planar reed support surface and mounted on said support with said reed support surface thereof facing said reed support surface of said support;
a reed unit disposed between and engaging said reed support surfaces, said reed unit comprising a base portion and at least two projecting vibratory reed portions and being movable relative to said support between at least two predetermined positions, one of said reed portions having an effective length that is a predetermined amount greater than that of the other of said reed portions when said reed unit is in either of said predetermined positions, and each of said reed portions being of greater effective length when said reed unit is in one of said positions than when said reed unit is in the other of said positions thereof; and, cooperating indicia on said reed unit and one of said support and said clamp indicating in which of said predetermined positions said reed unit is located, said support and said clamp each defining a respective edge aligned with the edge of the other and engaging said reed portion, and each of said edges including generally parallel edge portions stepped with respect to each other such that the edge portion engaging one of said reeds is more closely adjacent the end of said one reed than the edge portion engaging said another reed is to the end of said another reed.

20. The vibrometer of claim 19 wherein the distance between said edge portions is about equal to the difference in effective length between a reed of the construction of said one reeds having a natural frequency of $km_1/r_1$ and a reed of the same construction having a natural frequency of $km_2/r_1$.

21. A vibrometer comprising:

a support adapted for removable mounting on a vehicle and defining a generally planar reed support surface;

a reed clamp defining a generally planar reed support surface and mounted on said support with said reed support surface thereof facing said reed support surface of said support;

a reed unit disposed between and engaging said reed support surfaces, said reed unit comprising a base portion and at least two projecting vibratory reed portions and being movable relative to said support between at least two predetermined positions, one of said reed portions having an effective length that is a predetermined amount greater than that of the other of said reed portions when said reed unit is in either of said predetermined positions, and each of said reed portions being of greater effective length when said reed unit is in one of said positions than when said reed unit is in the other of said positions thereof; and, cooperating indicia on said reed unit and one of said support and said clamp indicating in which of said predetermined positions a said reed unit is located;

a case including a cover extending over and spaced from said clamp; and spring means engaging said clamp and forcing said clamp against said reed unit.

22. A vibrometer comprising:

a support adapted for removable mounting on a vehicle and defining a generally planar reed support surface;

a reed clamp defining a generally planar reed support surface and mounted on said support with said reed support surface thereof facing said reed support surface of said support;

a unitary reed unit disposed between and engaging said reed support surfaces of said support and said clamps, said reed unit comprising a base portion and at least two projecting vibratory reed portions and being movable relative to said support between at least two predetermined positions, one of said reed portions having an effective length that is a predetermined amount greater than that of the other of said reed portions when said reed unit is in either of said predetermined positions, each of said reed portions being of greater effective length when said reed unit is in one of said positions than when said reed unit is in the other of said positions thereof and said reed portions being substantially parallel to and spaced apart from each other;

means for urging said clamp and support towards each other; and, means for locating said reeds in said positions and including cooperating indicia on said reed unit and one of said support and said clamp for indicating in which of said positions said reeds are located, the distance each of said reeds moves between said positions thereof being about equal to the difference in effective length between a reed of the construction of said one reed having a natural frequency of $km_1/r_1$ and a reed of the same construction having a natural frequency of $km_2/r_2$.

23. A vibrometer comprising:

a support adapted for removable mounting on a vehicle and defining a generally planar reed support surface;

a reed clamp defining a generally planar reed support surface and mounted on said reed support with said reed support surface thereof facing said reed support surface of said support;

a reed unit disposed between and engaging said reed support surfaces, said reed unit including a vibratory reed portion comprising a pair of wires converging towards a tip spaced from said support and clamp and being movable relative to said support between at least two predetermined positions, said reed portion being of greater effective length when said reed unit is in one of said positions than when said reed unit is in the other of said positions thereof; and, cooperating indicia on said reed unit and one of said support and said clamp indicating in which of said predetermined positions said reed unit is located.

24. The vibrometer of claim 23 wherein said vibratory reed portion is generally wish-bone shaped and includes a weight mounted on said tip.

25. The vibrometer of claim 24 wherein said wires of said reed portion are about 0.010 in. in diameter and said weight weighs in the range of about 0.5 to 1.0 grams.

* * * * *